United States Patent [19]

Mains et al.

[11] 3,897,468

[45] July 29, 1975

[54] POLYBASIC ACID COMPOSITIONS OBTAINED FROM POLYMERIZED FATTY ACIDS

[75] Inventors: Harold E. Mains; Fred O. Barrett, both of Cincinnati, Ohio

[73] Assignee: Emery Industries, Inc., Cincinnati, Ohio

[22] Filed: Feb. 15, 1974

[21] Appl. No.: 442,996

[52] U.S. Cl. .............................................. 260/407
[51] Int. Cl.² ........................................... C08H 3/00
[58] Field of Search ................................... 260/407

[56] References Cited
UNITED STATES PATENTS

| | | | |
|---|---|---|---|
| 2,731,481 | 1/1956 | Harrison | 260/407 |
| 2,954,387 | 10/1960 | Bloch | 260/407 |
| 2,964,545 | 12/1960 | Harrison | 260/407 |
| 3,249,629 | 5/1966 | Rogier | 260/407 |

*Primary Examiner*—Patrick P. Garvin
*Assistant Examiner*—John F. Niebling
*Attorney, Agent, or Firm*—Gerald A. Baracka; John D. Rice

[57] ABSTRACT

The present invention provides a process for obtaining mixed acid compositions having significantly increased polybasic acid contents from polymerized fatty acids. The improved polybasic acid compositions are obtained by heating a polymerized fatty acid containing 50 percent or more dimer acid in the presence of a free radical initiator. In addition to significantly increased polybasic acid contents the resulting products have essentially all the carboxyl functionality available as —COOH.

12 Claims, No Drawings ent is excessive and therefore the process is very uneconomical-even if acceptable products could be obtained, which is not the case. Also, treatment in this manner often results in the formation of products which are highly colored and undesirable for many applications. Even more significant, however, is the fact that polybasic acids containing four or more carboxyl groups are obtained only in very small amounts with this method. Even though extremely large amounts of peroxide are used, only trimer acids are obtained in any significant amount. Still another disadvantage of the prior art process is that the products typically have much of the carboxyl functionality tied up as the ester so that even though they may contain relatively high average carboxyl functionality, this functionality is only partially useful since not all of it is available as free carboxyl groups. This is undesirable in applications where a free carboxyl function is desired, such as for cross-linking of polymers and other uses where complete reaction of the carboxyl moiety is required.

POLYBASIC ACID COMPOSITIONS OBTAINED FROM POLYMERIZED FATTY ACIDS

BACKGROUND OF THE INVENTION

Numerous applications are known for compounds containing a plurality of carboxyl groups. For example, suggested uses for dimer acid, a dibasic acid obtained by the polymerization of unsaturated monocarboxylic acids, include surface coatings, alkyd resins and oils, epoxy ester coatings and potting resins, urethane coatings, and polyamide resins. Various derivatives of dimer acid, including soaps and esters of dimer, are also useful in well drilling muds and greases and as plasticizers, adhesives, emulsifiers, lubricants, corrosion inhibitors and the like. For all of these applications the value of the dimer acid or dimer derivative lies in the fact that more than one functional group is present in the molecule. This permits cross-linking or a higher concentration of the desirable functionality which in turn imparts the desirable properties to the product. Similarly materials containing even higher average carboxyl functionality per molecule, such as trimer acids (a by-product or co-product obtained in the preparation of the dimer acids and separated from the dimer by molecular distillation) are useful in these and other applications.

It is also known that dimer acids can be obtained by the treatment of unsaturated acids with peroxides. U.S. Pat. Nos. 2,731,481 and 2,964,545 describe processes wherein unsaturated acids and esters thereof, such as oleic acid, linoleic acid and methyl linoleate, are treated with peroxide to produce dimeric fatty acids or esters. It is also recognized that in these processes as the amount of peroxide used is increased the tendency for the formation of trimers and higher polymers is also increased. By increasing the amount of free radical catalyst used in these processes it is possible to obtain materials having average carboxyl functionalities greater than two. This approach, however, is not without certain disadvantages which make the production of high functionality materials using these procedures highly impractical. In the first place, the amount of peroxide required is excessive and therefore the process is very uneconomical-even if acceptable products could be obtained, which is not the case. Also, treatment in this manner often results in the formation of products which are highly colored and undesirable for many applications. Even more significant, however, is the fact that polybasic acids containing four or more carboxyl groups are obtained only in very small amounts with this method. Even though extremely large amounts of peroxide are used, only trimer acids are obtained in any significant amount. Still another disadvantage of the prior art process is that the products typically have much of the carboxyl functionality tied up as the ester so that even though they may contain relatively high average carboxyl functionality, this functionality is only partially useful since not all of it is available as free carboxyl groups. This is undesirable in applications where a free carboxyl function is desired, such as for cross-linking of polymers and other uses where complete reaction of the carboxyl moiety is required.

It would be extremely useful and advantageous if products having high average carboxyl functionality could be obtained and if these materials contained significantly larger amounts of tetrabasic and higher acids than have heretofore been possible. It would be even more advantageous if these products had good color and if they could be obtained from a readily available feed source in an economical manner.

SUMMARY OF THE INVENTION

We have now discovered a process for producing polybasic acid compositions whereby these and other advantages are realized. The process of this invention involves heating polymerized fatty acid products, which are obtained by polymerizing monobasic acids, with a free radical initiator to obtain a significant increase in the polybasic acid content. The process is generally conducted at a temperature between about 50°C and 190°C and, more usually, between 130°C and 180°C. An organic peroxide is utilized in an amount between 1–35 percent by weight, preferably between 2.5–25 percent by weight, based on the weight of polymerized fatty acid. Di-t-butyl peroxide and 2,5-dimethyl-2,5-di(t-butylperoxy) hexane are especially useful free radical initiators for the process. The polymerized fatty acids are typically derived from thermal or clay catalyzed polymerizations of $C_{16-26}$ unsaturated monocarboxylic acids, preferably $C_{18}$ acids such as oleic acid, linoleic acid and mixtures thereof. Useful polymerized fatty acids for the process contain 50 percent or more dimer acid. More usually the polymerized fatty acid starting material will contain 75 percent or more dimer, 25 percent or less trimer and less than about 5 percent monobasic acid.

The products obtained by this process have significantly increased polybasic acid contents over the starting material and products obtained using prior art processes. Typically the products contain 20 percent or more, and preferably more than 35 percent, polybasic acids of which at least 40 percent contain four or more carboxyl groups. The polybasic acid compositions of this invention have average carboxyl functionalities in the range 2.4 – 4.0 with acid values and saponification values in close agreement, generally within 5 percent of each other.

DETAILED DESCRIPTION

The present invention is directed to a process which, in its simplest terms, involves heating a polymerized fatty acid or ester of a polymerized fatty acid or derivatives of polymerized fatty acids with a free radical initiator to increase the functionality of the material. Significantly improved products are obtained by employing an already polymerized fatty acid as opposed to directly treating unsaturated monocarboxylic acids with peroxides as the prior art teaches. It is quite unexpected that significant differences in the composition and properties of the products are obtained with this process.

While this invention is directed primarily to obtaining more highly functional polybasic acids, if desired, it is also adaptable for use with various acid derivatives, such as esters and amides. The process is capable of increasing ester and amide functionality when the corresponding polymeric acid derivative is employed as the starting material. Therefore, in describing the invention it should be understood that whenever reference is made to polymeric fatty acid and polybasic acids derived therefrom that these and other derivatives thereof are also intended and can be used. Also, throughout the description the terms monomer, dimer and trimer are used interchangeably with monobasic acid, dibasic acid and tribasic acid, respectively, and are considered to be synonymous therewith. The term polybasic acid as used herein includes tribasic and higher acids but does not include monobasic and dibasic acids.

To obtain the improved products of this invention, polymeric fatty acids are used as the starting material and heated in the presence of peroxide. Useful polymerized fatty acids for this invention are any of the well known and commercially available mixed acid products containing 50 percent or more by weight dimer acid. The particular polymerization method used to obtain the dimer acid products is not critical and the starting materials can be obtained for example, by the polymerization of unsaturated monocarboxylic acids using treated or untreated clay catalysts or acid catalysts, such as HF, $BF_3$, $AlCl_3$, $SnCl_3$. Dimer acids obtained by thermal processes such as described in U.S. Pat. No. 2,482,761 can also be used. The polymerized fatty acids may also be obtained from less common processes such as by treatment of unsaturated monocarboxylic acids with electrical discharges or by the treatment of saturated and unsaturated monocarboxylic acids with atomic hydrogen generated by the thermal or photochemical dissociation of hydrogen molecules. As long as the polymerized fatty acid contains the requisite amount of dimer acid and satisfies the other requirements the particular source of the material is not important. As a practical matter, however, the starting materials will most often be obtained from thermal processes or clay catalyzed processes since these are used to the almost complete exclusion of other methods for the preparation of commercial dimer acids.

Dimer acid starting materials for the process of this invention are obtained by combining two molecules of a $C_{16-26}$ monocarboxylic acid, usually containing one or more sites of unsaturation. The exact nature of linkages involved in the dimer structure has not been determined. It may be a single carbon-carbon bond, a cyclic or similarly complex structure, or it may vary depending on the process used. When manufactured from unsaturated $C_{16-26}$ monocarboxylic acids the resultant dimer acids contain unsaturation which, if desired, can be removed by hydrogenation prior to use in the process. In the thermal and clay catalyzed polymerization procedures, unsaturated $C_{16-26}$ monocarboxylic acids, such as oleic acid, linoleic acid, linolenic acid, eleostearic acid or other singly or doubly unsaturated acids, are usually employed.

Especially useful polymerized fatty acids for this invention are the $C_{36}$ polymeric (dimer) acids obtained by the thermal or clay catalyzed polymerization (dimerization) of unsaturated $C_{18}$ fatty acids, particularly, oleic acidd, linoleic acid and linolenic acid and mixtures thereof. Such products are commercially available having varying percentages of the $C_{36}$ dimer acid and $C_{54}$ trimer acid and sold under the trademark "EMPOL." Monomer and trimer acids are also present in the polymerized fatty acid products obtained from the clay catalyzed dimerization process, however, these are not detrimental to the process of this invention as long as 50 percent or more by weight of the product is dimer. The monobasic acid content should not generally exceed about 5 percent by weight and it will typically be less than 2.5 percent. In general it is found that more efficient production of polybasic acids is obtained when the monomer content is low. Trimer contents may range as high as 50 percent by weight of the product, however, it is more usual that the trimer be present in amounts of 25 percent or less with the dimer acid constituting 75 percent or more of the product. Polybasic acids having more than three carboxyl groups are not generally present in appreciable amounts in the polymerized fatty acid starting materials.

A free radical initiator is employed to obtain the improved products having increased polybasic acid contents. Any conventional free radical initiator can be used, however, best results are obtained when organic peroxides are employed. The particular peroxide used will depend on the conditions and, to some extent, the polymerized fatty acid derivative being reacted. The amount of free radical initiator can be varied quite extensively, however, from about 1 percent to about 35 percent by weight, based on the polymerized fatty acid, is generally used. More preferably the amount of free radical initiator will range from about 2.5 percent to about 25 percent by weight. Free radical initiators commonly used include: benzoyl peroxide, 2,4-dichlorobenzoyl peroxide, lauroyl peroxide, acetyl peroxide, bis (1-hydroxycyclohexyl)peroxide, t-butyl perbenzoate, di-t-butyl peroxide, t-butyl hydroperoxide, 2,5-dimethylhexane-2,4-di(peroxybenzoate), 2,5-dimethyl-2,5-di(t-butylperoxy)hexane, pelargonyl peroxide, methyl ethyl ketone peroxide, dicumyl peroxide, decanoyl peroxide, p-chlorobenzoyl peroxide, di-t-amyl peroxide and azo bis-isobutyronitrile. Excellent results are obtained with di-t-butyl peroxide and 2,5-dimethyl-2,5-di(t-butylperoxy) hexane.

The process of this invention involves contacting a fatty acid containing 50 percent by weight or more dimer acid with the free radical initiator at a temperature from about 50°–190°C and, more preferably 130°–180°C for a period of time sufficient to bring about an increase in the polybasic acid content of the material. The time and temperature required to bring about the reaction will depend on the particular polymeric fatty acid material being treated and the initiator employed, as will be recognized by those skilled in the art. It is evident that when initiators having relatively low energies of dissociation are used that lower reaction temperatures are employed. The usual reaction procedure involves charging the polymeric fatty acid and initiator to the reaction vessel and heating the mixture with moderate agitation. An inert atmosphere of nitrogen, helium or the like is usually maintained, however, this is not absolutely necessary. The heating is continued for a period of time sufficient to significantly increase the polybasic acid content. The increase in polybasic acids can be determined by taking a sample of the reaction mixture and analyzing using thermal gravimetric procedures or by converting the acids to the methyl esters followed by distillation and identification. To terminate the reaction, the temperature is increased, generally to about 200°C or slightly higher, to destroy any residual free radical initiator and to strip off the last traces of volatile decomposition which may have been formed during the reaction. The removal of volatile materials is faciliated by applying a vacuum to the system or increasing the flow of nitrogen or other inert gas to sweep away the volatile materials. The reaction mixtue is allowed to cool and the product is then ready for use without any further treatment or work up.

The polybasic acid compositions obtained from this process are mixed acid products containing 20 percent or more by weight polybasic acids and more preferably, greater than 35 percent polybasic acids. While polybasic acid compositions having less than 20 percent polybasic acids are not generally produced using this process they may nevertheless be obtained simply by adjusting the amount of initiator employed. The remainder of the product consists primarily of dimer acids with small amounts (generally less than 2 percent) monobasic acids possibly being present. The mixed acid products have average carboxyl functionalities ranging from about 2.4 to 4.0 and, more preferably, from about 2.6 to 3.4. The polybasic acid portion of the product contains at least 40 percent acids having four or more carboxyl groups with the remainder of the polybasic acid fraction being trimer. Especially useful products of this invention have 50 percent or more of the polybasic acids with four or more carboxyl groups. It is also observed that the products obtained with the present process have acid values and saponification values which are in close agreement, generally within 10 percent, and in cases where clay catalyzed polymeric acids are used as the starting material, within 5 percent. This is significant since it is an indication that the carboxyl functionality is available as —COOH rather than having been converted to ester or other similarly nonreactive groups.

The products of this invention find application in the same general use areas where dimer and trimer acids are used. In many instances the polybasic acid products can be directly substituted into existing formulations replacing all or part of the dimer or trimer acids and obtaining improved results. The products are particularly useful as cross-linking agents and in systems where carboxyl functionality is needed to react with amine or hydroxyl functionality to form amide and ester linkages, such as in the formation of polyamides and polyesters. The products of this invention can be used in the formation of solid or liquid, thermosetting or thermoplastic, polyamide resins useful in inks, adhesives and sealants, surface coatings, paper coatings and binders, and for electrical potting and encapsulation materials. They are also useful in the preparation of unsaturated polyesters having a wide range of properties depending on the reactant ratios used. Polyesters having good flexibility and resiliency are obtainable in this manner. The polybasic acids are also useful in epoxy resin formulations for use as coatings and as potting materials. Useful urethane coatings, which can be either one or two component systems, are also obtained with the polybasic acids of this invention.

In addition to the above polymer applications, the polybasic acids of this invention, as well as derivatives thereof, can be utilized in a variety of other applications. The polybasic acids may be used, for example, as driers and as bodying agents for use in the cooking of drying oils to shorten the kettle time required. The polybasic acids may be converted to soaps by treatment with alkalies in the conventional manner and these soaps used as lubricants for metalworking, corrosion inhibitors, emulsifiers and in the preparation of greases and oil well drilling muds. Esters and amides of the polybasic acids are also useful for these and similar applications. The polybasic acids may also be ethoxylated, propoxylated or otherwise modified to provide numerous other materials having useful properties.

The following examples serve to illustrate the invention more fully, however, they are not to be construed as a limitation on the scope thereof. In the examples all parts and percentages are given on a weight basis unless otherwise indicated.

EXAMPLE I

To a round bottom four-necked glass flask fitted with a stirrer, a nitrogen inlet, a thermometer and recycle trap topped with a condenser was charged 640 grams of a polymerized fatty acid (Empol 1018 Dimer Acid) and 41 grams di-t-butyl peroxide (6.4 percent based on the polymerized fatty acid). Maintaining a nitrogen atmosphere the reaction mixture was slowly agitated while heating for about 8 hours over the temperature range 140°–155°C. During this time volatile decomposition products (mainly t-butanol) were collected in the trap. The temperature was then raised to a maximum of about 200°C over a 2½ hour period while applying a vacuum on the system. About 15 grams of volatile strippings were removed in this manner.

The resulting product had an acid value (AV), determined by A.O.C.S. Method Te 1a-64T, of 193. Also, the product had a significantly increased polybasic acid content as determined by converting the acids to the methyl esters and determining the percentages of monomer, dimer, and polybasic acids by distillation. Whereas Empol 1018 polymerized fatty acid contains less than 1 percent monobasic acid, about 83 percent dimer and 17 percent trimer and small amounts of other polybasic acids, the product of this Example contains about 1 percent monobasic acid, 59 percent dimer and 40 percent polybasic acids containing three or more carboxyl groups. It is readily apparent from the above analysis that an increase in the polybasic acid content of over 20 percent is obtained when polymerized fatty acids are reacted in accordance with the process of this invention. There was little change in the color of the resulting product from that of the starting material. Still more significant, and not evident from the above analysis, is the fact that over 50 percent of the polybasic acids obtained were acids containing more than three carboxyl groups, generally from four to six.

EXAMPLE II

Employing a procedure similar to that described in Example I the reaction was repeated on a larger scale. One-hundred and ten pounds of the polymerized fatty acid (color - 8 Gardner) and 7 pounds di-t-butyl peroxide were charged. The reaction mixture was refluxed for about 4 hours while maintaining the pot temperature between 145°C and 160°C. To remove the last traces of volatile materials the temperature was finally raised to about 180°C and a vacuum applied on the system. The final product had the following properties:

| | |
|---|---|
| Gardner Color | 9 |
| Acid Value | 189 |
| Saponification Value (A.O.C.S. Tl 1a-64T) | 190 |
| Kinematic Viscosity: | |
| 100°F | 6,200cS |
| 210°F | 150cS |
| Pour Point | 35°F |

The thermal gravimetric analysis (TGA) was used to determine the amounts of monobasic, dibasic and polybasic acids present in the product and the starting material. The TGA of the product indicated the composition to be 1 percent monobasic acid, 62 percent dimer and 37 percent polybasic acid as compared to 2.5 percent monobasic acid, 79.5 percent dimer and 18 percent polybasic acids present in the starting material. In this procedure a 10–12 milligram sample of the product to be analyzed is heated in a DuPont 950 Thermogravimetric Analyzer at a rate of 2°C/minute under a vacuum of 0.1–0.15 mm Hg. The monobasic acid is determined by the weight loss up to 155°C. Percent dimer is calculated by determining the weight loss from 155°C to a temperature, usually between about 225°C and 250°C, where a noticeable inflection occurs in the curve. Where no inflection is apparent the polybasic acid content is reported simply as the residual weight at 250°C. This TGA procedure correlates closely with results obtained using the methyl ester distillation technique and is a quick and convenient means to determine the percentages of the mono-, di- and polybasic acids.

A sample of the product was molecularly distilled using a Rodney-Hunt still to separate the unreacted dibasic and monobasic acids from the trimer acid and other polybasic acids. This residue, about 40 percent weight of the total product, contained less than 10 percent dimer acid and was analyzed using thin layer chromatography to determine the amount of tetrabasic and higher polybasic acids present. The sample was adsorbed on a thin layer of silica gel and the components separated using a solvent consisting of 1 part acetic acid, 50 parts isooctane and 50 parts ethyl ether. The spots were visualized with iodine vapors and the percentages of the components determined. About 50 percent of the polybasic acids were tetrabasic acids and acids of even higher functionality.

This Example demonstrates that when polymerized fatty acids are treated in accordance with this invention it is possible to more than double the polybasic acid content of the starting material. Furthermore, it is observed that the reaction mixture does not appreciably darken upon such treatment. Also, the acid value and saponification values obtained for the product are essentially identical, indicating that all of the carboxyl functionality is available as —COOH. This finding is contrary to previously known processes where unsaturated monocarboxylic acids are directly treated with peroxide to obtain mixed acid products. Using the heretofore known procedures it has been found that much of the carboxyl functionality is converted to ester and thus the efficiency of the mixed acid product is significantly reduced for many end-use applications.

EXAMPLE III

To demonstrate the utility of the polybasic acid products of this invention the product of Example I was evaluated as a curing agent in an epoxy resin system and compared with two commercially available high functionality acids commonly used for this purpose. The resins were formulated in accordance with the following recipe:

|  | A | B | C |
|---|---|---|---|
| Epon resin 828 (Epoxide equivalent 185-192) | 100 parts | 100 parts | 100 parts |
| Product of Example I | 100 parts | — | — |
| Empol 1040 Trimer Acid[1] | — | 100 parts | — |
| Empol 1041 Trimer Acid[2] | — | — | 100 parts |

[1]80% tribasic acid
[2]90% tribasic acid

After compatibilizing the mixture at 145°C for 3–4 hours, 1.5 parts benzyl dimethylamine catalyst was added to each of the epoxy formulations which were then cured at 125°C for 4 hours. Dumbbells were cut from the cured sheets and physical properties obtained on the test pieces using an Instron Tester. Values were obtained by averaging the results obtained with four specimens and are as follows:

|  | Tensile Strength (psi) | | |
|---|---|---|---|
|  | A | B | C |
| 30% Elongation | 1640 | 1616 | 1416 |
| 60% Elongation | 1895 | 1916 | 1867 |
| 80% Elongation | 2340 | 2200 | 2475 |
| Rupture | 2630 (94%E) | 2300 (80%E) | 2500 (82%E) |

The above data indicate that highly useful flexible resins are obtainable using the polybasic acid product of this invention. The cures obtained with these products are comparable, and in some instances superior, to cures obtained with the commercial products which are widely used throughout the industry for this purpose.

EXAMPLE IV

Example I was repeated using 548 grams of the dimer acid and 35 grams 2,5-dimethyl-2,5-di(t-butylperoxy)-hexane (6.4 percent based on the dimer charge). The reaction mixture was heated for about 7 hours at 150°–160°C during which time 18 mls. distillate was removed. The product had an acid value of 188 with a 7 Gardner Color. TGA showed the product to contain about 2.5 percent monobasic acid, 62.5 percent dibasic acid and 35 percent polybasic acids.

EXAMPLE V

The following experiment was carried out using a polymerized fatty acid obtained by the thermal polymerization of linoleic acid in the presence of water at 340°C and 400 psi for 4 hours. 454 grams of this thermally polymerized material (AV 182; 4 percent monobasic acid; 67 percent dibasic acid; 29 percent tribasic acid) were heated in accordance with the previously described procedures with 29 grams di-t-butyl peroxide. The resulting product had an acid value of 177, saponification value of 189 and contained 40 percent polybasic acids.

EXAMPLES VI - IX

A series of reactions was conducted using the polymerized fatty acid of Example I and employing the same general procedures. In these reactions di-t-butyl peroxide was used as the free radical initiator. The table below sets forth the amount of catalyst used for each run, the acid value of the product and the amount of polybasic acids obtained.

| EXAMPLE | % CATALYST | ACID VALUE | POLYBASIC ACID |
|---|---|---|---|
| VI | 2.6 | 190.5 | 28 |

| EXAMPLE | % CATALYST | ACID VALUE | POLYBASIC ACID |
|---|---|---|---|
| VII | 5.1 | 187 | 38 |
| VIII | 12.7 | 191 | 48 |
| IX | 25 | 188 | 66 |

EXAMPLES X – XI

A commercially available clay-catalyzed polymeric fatty acid (Empol 1016) containing 2.5 percent monobasic acid, 77.5 dibasic acid and 20 percent tribasic acid by TGA analysis was reacted using 3.8 percent and 6.2 percent di-t-butyl peroxide catalyst, respectively. The resulting products were characterized as follows:

| EXAMPLE | X | XI |
|---|---|---|
| Acid Value | 191 | 190.5 |
| Gardner Color | 5+ | 5.5 |
| % Polybasic Acid | 36 | 44 |

EXAMPLE XII 410 grams of a hydrogenated polymerized fatty acid containing 97 percent $C_{36}$ dibasic acid and 3 percent $C_{54}$ tribasic acid were heated with 26.3 grams di-t-butyl peroxide for 5½ hours between 150°–165°C and an additional hour at 205°C. During the heating and stripping about 17 mls of volatile distillate were removed from the reaction mixture. The product had a Gardner color of 7 with an acid value of 195. TGA analysis showed the polybasic acid content to be 23 percent.

EXAMPLE XIII

A polymerized fatty acid (Empol 1024) containing about 19 percent trimer by TGA was reacted as described in the previous Examples using 6.4 percent di-t-butyl peroxide as a free radical initiator. The resulting product contained 38 percent polybasic acids and had an acid value of 191. The Kinematic viscosity (210°F) of the mixed acid product was 162 centistokes.

EXAMPLE XIV

To demonstrate the improved results obtainable with the present invention, an experiment was conducted wherein 1348 grams oleic acid (Emersol 221) and 140 grams di-t-butyl peroxide were reacted in accordance with the teachings of U.S. Pat. No. 2,731,481. The reaction mixture was heated from about 140°C to 170°C under a nitrogen atmosphere with slow agitation for about 10 hours and finally at about 200°C while sweeping the system with a vigorous stream of nitrogen to complete the removal of volatile decomposition products. TGA analysis of the product showed only 17.5 percent polybasic acids to be present in this mixmture. The mixture was distilled and 450 grams residue (Gardner color 11.5) having an acid value of 183 and a saponification value of 200 obtained. This product had an average carboxyl functionality of 2.5–2.6. By distillation it was possible to obtain a product containing about 50 percent polybasic acids, however, much of the carboxyl functionality is not available as -COOH as evidenced by the difference in acid and saponification values. Thin layer chromatography also indicated that only about 10 percent of the polybasic acids contained four or more carboxyl groups. In other words, the polybasic acid portion of the mixture is almost entirely trimer acid much of which is esterified.

To demonstrate the significance of this feature 100 grams of the product was combined with 100 grams Epon 828 and 1.5 grams benzyl dimethylamine catalyst. The epoxy system was then cured using the conditions previously described. The cured resin failed at 1590 psi and 84 percent elongation as compared to 2630 psi (93.5 percent E) for the resin formulated in the same manner but using the product of Example I. This clearly indicates the superiority of the products of this invention.

EXAMPLE XV

To again demonstrate the superiority of the products of this invention over those heretofore known, tall oil fatty acid which contains a large amount of unsaturated fatty acids (oleic and linoleic acids) was treated as follows: 1754 grams tall oil fatty acid and 180 grams di-t-butyl peroxide were heated for about 10 hours between 140°C and 170°C. The temperature was then raised to 200°C to complete the removal of volatile decomposition products (184 mls). The resulting mixture contained only 16 percent polybasic acids. Distillation yielded 582 grams of a high boiling residue which contained about 50 percent polybasic acids and had an average carboxyl functionality of 2.5–2.6. Thin layer chromatography showed that about 85 percent of the polybasic acid was tribasic acid. The residue had an 11 Gardner color, acid value of 178 and saponification value of 192. When 100 grams of the product was mixed with 100 grams Epon 828 and 1.5 grams benzyl dimethylamine and cured, a brittle resin, which could withstand only 68 percent elongation before failure resulted.

The preceding examples illustrating the process of the invention clearly demonstrate that significant differences in the composition and properties of the polybasic acid compositions are obtained. There are, however, still other merits of the invention which may not be as apparent but which nevertheless are important considerations. By starting with a polymerized acid rather than directly with the monobasic acid more efficient utilization of the relatively expensive peroxide initiator is possible. This of course is in addition to significantly different compositions being obtained. Besides improved color and higher reactive carboxyl content the products of the present process also have improved stability against heat and oxidation. This increased stability may be due to differences in structure obtained with the present products versus those of the prior art.

We claim:

1. A process which comprises heating a polymerized fatty acid containing 50 percent by weight or more dimer acid and less than 5 percent by weight monobasic acid with 1 to 35 percent by weight, based on the polymerized fatty acid, of free radical initiator at a temperature between about 50°C and 190°C to increase the polybasic acid content of the mixture.

2. The process of claim 1 wherein the polymerized fatty acid is obtained from the thermal or clay catalyzed polymerization of a $C_{16-26}$ unsaturated monocarboxylic acid.

3. The process of claim 2 wherein the polymerized fatty acid contains 75 percent or more dimer acid 25 percent or less trimer acid and less than 2.5 percent monobasic acid.

4. A process of claim 2 wherein the unsaturated monocarboxylic acid is a $C_{18}$ acid selected from the group consisting of oleic acid, linoleic acid, linolenic acid, and the mixtures thereof.

5. The process of claim 4 wherein the polymerized fatty acid contains less than 2.5 percent monobasic acid, 75 percent or more $C_{36}$ dimer acid and 25 percent or less $C_{54}$ trimer acid.

6. The process of claim 2 wherein the temperature is between about 130°C and 180°C and the free radical initiator is an organic peroxide.

7. The process of claim 6 wherein the organic peroxide is present in an amount from about 2.5 percent to about 25 percent by weight and is selected from the group consisting of di-t-butyl peroxide and 2,5-dimethyl-2,5-di(t-butylperoxy)hexane.

8. The process of claim 7 wherein the polymerized fatty acid is obtained from the thermal or clay catalyzed polymerization of a $C_{18}$ monocarboxylic acid selected from the group consisting of oleic acid, linoleic acid, linolenic acid and mixtures thereof and contains less than 2.5 percent monobasic acid, 75 percent or more $C_{36}$ dimer acid and 25 percent or less $C_{54}$ trimer acid.

9. A mixed acid product having an average carboxyl functionality in the range 2.4 to 4.0 obtained by the peroxide treatment of a polymerized fatty acid comprising dimer acid and 20 percent by weight or more polybasic acids, with at least 40 percent of said polybasic acids having four or more carboxyl groups.

10. The mixed acid product of claim 9 wherein the acid value and saponification value agree within 10 percent.

11. The mixed acid product of claim 9 which contains less than 2 percent monobasic acids and having an average carboxyl functionality from 2.6 to 3.4.

12. The mixed acid product of claim 11 having a polybasic acid content greater than 35 percent and an acid value and saponification value within 5 percent of agreement.

* * * * *